United States Patent [19]
Orain

[11] Patent Number: 4,604,077
[45] Date of Patent: Aug. 5, 1986

[54] CONSTANT-SPEED TRIPOD JOINT HAVING AN AXIAL RETENTION

[75] Inventor: Michel A. Orain, Conflans Sainte Honorine, France

[73] Assignee: Glaenzer Spicer, Poissy, France

[21] Appl. No.: 710,525

[22] Filed: Mar. 12, 1985

Related U.S. Application Data

[63] Continuation of Ser. No. 473,434, Mar. 9, 1983, abandoned.

[30] Foreign Application Priority Data

Mar. 15, 1982 [FR] France .............................. 82 04318

[51] Int. Cl.[4] ............................. F16D 3/20; F16D 3/30
[52] U.S. Cl. ..................................... 464/111; 464/905
[58] Field of Search ............... 464/111, 122, 123, 124, 464/132, 905

[56] References Cited

U.S. PATENT DOCUMENTS

| 2,670,614 | 3/1954 | Wildhaber | 464/905 X |
| 4,175,407 | 11/1979 | Orain | 464/905 X |

FOREIGN PATENT DOCUMENTS

| 759573 | 5/1953 | Fed. Rep. of Germany . |
| 461477 | 12/1913 | France . |
| 1352259 | 1/1964 | France ............................. 464/111 |
| 1398210 | 3/1965 | France . |
| 1398998 | 4/1965 | France . |
| 2199825 | 4/1974 | France . |
| 2369456 | 5/1978 | France . |
| 2422064 | 11/1979 | France . |
| 2476775 | 8/1981 | France . |
| 1002479 | 8/1965 | United Kingdom . |

*Primary Examiner*—Stuart S. Levy
*Assistant Examiner*—Daniel P. Stodola
*Attorney, Agent, or Firm*—Wenderoth, Lind & Ponack

[57] ABSTRACT

Each roller of a joint is mounted not only to slide and rotate on a corresponding arm 8 of a tripod element, but also to pivot about a single axis which is parallel to the general axis of the tripod element. The tripod element is in this way self-retaining axially in the bell element of the joint. The joint has a high capacity for a small volume and a light weight and a high efficiency, even at large break angles of operation, and is suitable for driving the front wheels of automobile vehicles.

9 Claims, 8 Drawing Figures

CONSTANT-SPEED TRIPOD JOINT HAVING AN AXIAL RETENTION

This application is a continuation of now abandoned application Ser. No. 473,434 filed Mar. 9, 1983.

BACKGROUND AND SUMMARY OF THE INVENTION

The present invention relates to a constant-speed tripod joint of the type comprising a bell element provided with three pairs of tracks, the lines of the centers of which are curved, and a tripod element fixed axially inside the bell element, this tripod element comprising three arms each of which carries a roller which slides along the arm and is preferably rotatable about the axis of the arm. These joints are usually employed for driving the driving wheels of front-drive automobiles.

An object of the invention is to provide a constant-speed joint of this type, which has a high torque transmission capacity for a small volume and low weight and a high efficiency, even at large break angles.

The invention therefore provides a joint of the aforementioned type, wherein each roller is also mounted to pivot about a single axis which is parallel to or roughly parallel to the general axis of the tripod element.

Owing to this feature, the axial retention of the tripod element can be ensured solely by the bearing of the rollers against the edges of the tracks.

In an advantageous embodiment which ensures a very good guiding of the rollers, each roller has a toric rolling surface, each track having a corresponding toric surface which is bordered on the outer edge by a spherical region which is centered on the center of the bell element.

Preferably, in order to reduce risk of jamming, each track surrounds the corresponding roller at an angle of about 120°.

BRIEF DESCRIPTION OF THE DRAWINGS

The invention is described hereinafter in more detail with reference to the accompanying drawings which show only some embodiments. In the drawings.

DETAILED DESCRIPTION OF THE INVENTION

Figure 1:
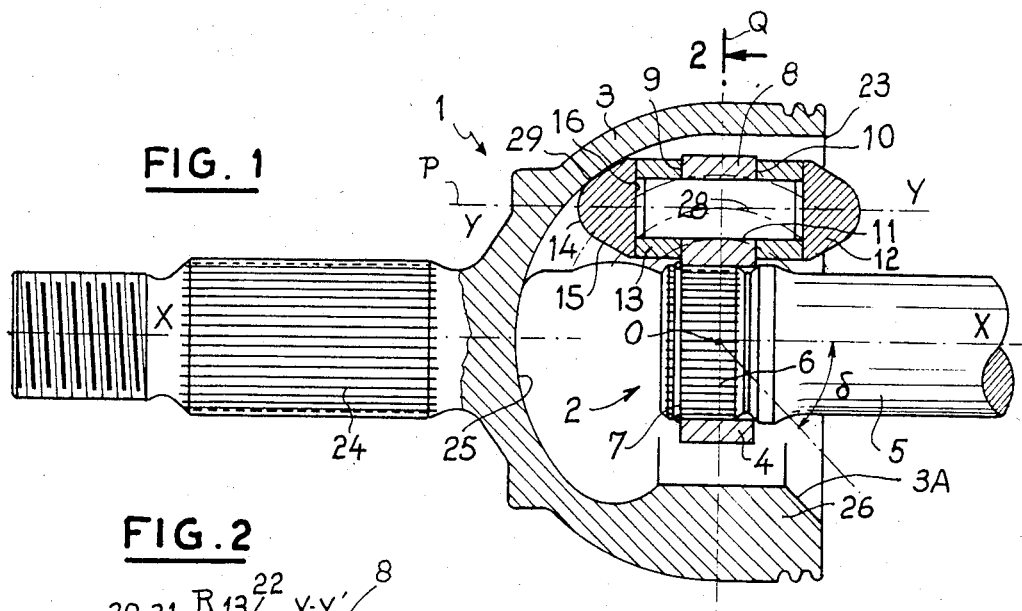
FIG. 1 is a longitudinal sectional view of a constant-speed joint according to the invention.

In the following description, the tripod joints will be described in their preferably aligned positions as shown in the drawings. The joints then have a ternary symmetry about their axis X—X.

Figure 2:
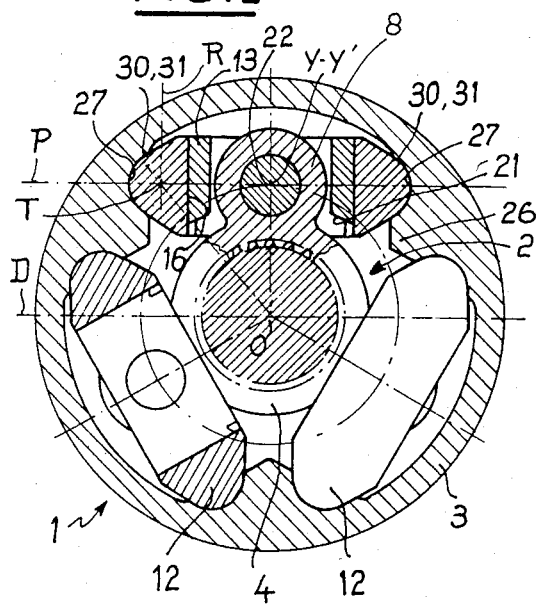
FIG. 2 is a cross-sectional view thereof taken along line 2—2 of FIG. 1.

The joint 1 shown in FIGS. 1 and 2 comprises a male or tripod element 2 which is received in a female or bell element 3.

The tripod element 2 comprises a central hub 4 fitted on a shaft 5 and keyed to the latter at a short distance from its end by splines 6 and a circlip 7. Extending radially outwardly from hub 4 and spaced 120° apart are three arms 8 each of which has a cylindrical shape having an axis Y—Y parallel to the axis X—X and is defined by two planar end surfaces 9, 10 perpendicular to the axis X—X. Each arm 8 has a central bore 11 centered on the axis Y—Y. Each arm 8 carries a rotatable slidable and pivotable roller 12 with interposition of a bearing bush 13.

Each roller 12, which is symmetrical relative to a median plane parallel to the axis X—X, comprises an outer surface constituted essentially by a toric region 14 which is extended by two frustoconical regions 15. Internally, the roller defines a cylindrical bore 16 whose axial dimension is relatively large owing to the presence of the two regions 15.

Figure 3:
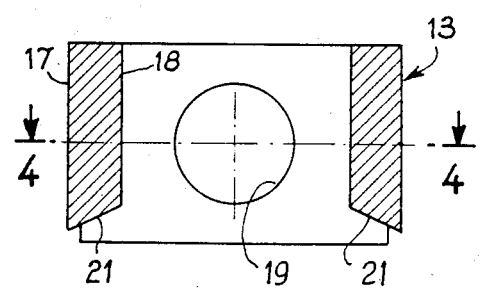
FIG. 3 is a longitudinal sectional view, on an enlarged scale, of a bearing bush of this joint.
Figure 4:
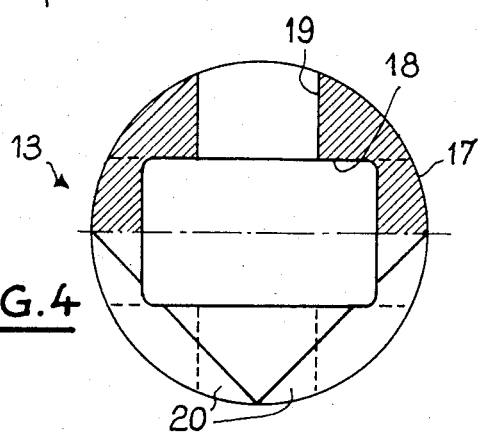
FIG. 4 is a view of the same bearing bush, partly in top plan and partly in section along line 4—4 of FIG. 3.

Bearing bush 13 is shown in FIGS. 3 and 4. It comprises a cylindrical outer surface 17, an axial aperture 18 having a constant rectangular section roughly corresponding to the diametrical section of the arm 8 and, half-way along its height, a diametrical bore 19 having the same diameter as the bore 11 of the arm 8. Its outer end surface is provided with four outer chamfers 20 which extend from the ends of the two axes of symmetry of the aperture 18, and two diametrically opposed inner chamfers 21 provided on the inner end surface of the bush, on each side of the bore 11.

Each bearing bush 13 is mounted by its aperture 18 on an arm 8, and a pin 22, whose length is slightly less than the diameter of the bush, is mounted with a force fit in the bore 11 and extends on each side of the bore 19. Thus, the bush is mounted on the pin 22 to pivot about the axis Y—Y and the corresponding roller 12 is rotatably and slidably mounted by its bore 16 on the cylindrical surface 17 of the bush.

The bell element 3 has a generally semi-spherical shape and a thin wall which extends somewhat beyond its transverse diametrical plane Q and is defined by a planar surface which defines an entrance opening 23. Opposite to the latter, the bell element is rigid with a second shaft 24 which is connected to the shaft 5 by the joint 1 and constitutes for example a wheel stub-axle.

An inner spherical surface 25 of the bell element 3 is provided with three ribs 26 (FIG. 2) defining three cavities for the rollers 12. Each cavity is laterally bordered by two confronting tracks 27.

Each track 27 has a concave toric shape, and its cross-section is constant in the shape of an arc of a circle whose radius is very slightly greater than that of the toric surface 14 of the rollers, a line 28 through the center of the track is also circular and it is contained in a plane R perpendicular to a plane P when the joint is in alignment and parallel to the axis of the shaft 24, and centered on the diameter D of the bell element perpendicular to this plane R. The line 28 extends through about 90° from the entrance 23 of the bell element symmetrically relative to the transverse diametrical plane Q of the bell element.

When the joint is in alignment, the plane Q is also an axial plane of the rollers 12. The mean planes P of the latter are parallel to the axis X—X. The rollers are tangentially in contact by their surface 14, on one hand, with the section of the tracks 27 contained in the plane Q (FIG. 2), and, on the other hand, with a point 29 of the inner spherical surface 25 of the bell element (FIG. 1).

If a pull is exerted on the shaft 5, the rollers abut against the outer edge of their track 27 and, as they cannot turn about an axis perpendicular to the axis Y—Y of the pin 22, they are immobilized. This abutment and, in the other direction, the contacts 29, axially position the tripod element in the bell element in a positive and natural manner, even when the joint has a break angle without requiring any additional means, since the tangential contact of the three tori 27, 14, 27 constrains the axis of revolution of each roller to pass through the centre 0 of the bell element.

It is even possible to dispense with the contacts 29, which are rather difficult to obtain, by improving the guiding of the rollers in the following manner. The outer edge of each track 27 is extended by a small spherical region 30 centered on the center 0 of the bell element. The rollers 12 are then slightly smaller and the tori 14 and 27 are tangent to each other and to the sphere 30 at a common point 31 on each side of the diametrical plane of the bell element containing the axes X—X and Y—Y. Geometrically, this corresponds to the aligment of the points 31 and 0 with the center T of the track, which point T pertains to the line of the centers of this track.

This breaking of the joint and the pivoting of the rollers about the axes Y—Y are allowed by the chamfers 20 and 21 of the bearing bushes 13. The maximum break angle δ of the joint is defined (FIG. 1) by the contacting of the shaft 5 with the chamfers 3A provided at the entrance of the bell element. It may be as much as 50°. The joint 1 is therefore a joint having a very large break angle and has for a small overall size a specific capacity (or torque capacity with respect to the cube of the outside diameter) considerably greater than that of conventional joints, this latter advantage resulting in particular from the large dimensions of the three rollers 12 inscribed within the bell element 3 (FIG. 2).

Each track 27 surrounds the roller 12 over an arc of about 120°, which avoids any jamming.

Figure 5:
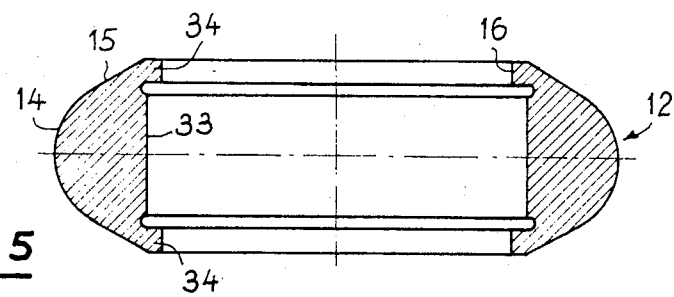
FIG. 5 is a longitudinal sectional view of a modification of the roller.
Figure 6:
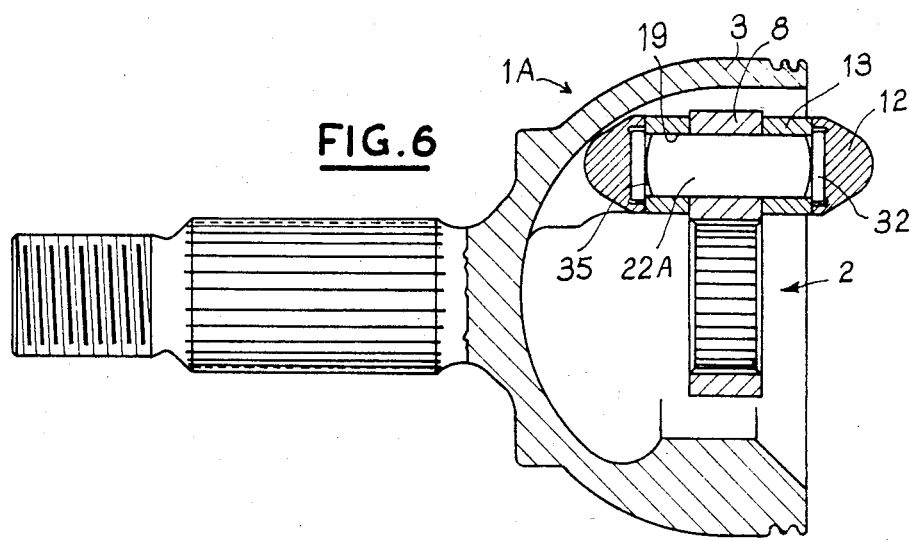
FIG. 6 is a partial longitudinal sectional view of a joint according to the invention employing rollers such as that shown in FIG. 5.

The modification of the joint 1A shown in FIGS. 5 and 6 differs from the foregoing joint only in that the rollers 12 are rotatably and slidably mounted on the bearing bushes 13, which are not modified, with interposition of needle bearings 32. For this purpose, each roller has in its bore 16 a recess 33 bordered by two needle retaining flanges 34. Further, the ends 35 of the pins 22A are spherical and centered in the middle of these pins so as to retain the needles in the middle thereof at each end in the region of the orifices by way of which the bores 19 of the bushes communicate with the exterior of the latter.

In this embodiment, the operation of the joint at an angle and when transmitting torque occurs practically by pure rolling motion and consequently with a high efficiency. There is thus provided a constant-speed joint which does not require any cooling and can therefore operate within a mechanical unit (for example a wheel hub). Further, this feature allows the use of lubricant having very good qualities of performance under very cold conditions but less good features under hot conditions since there is practically no friction, which considerably facilitates the question of performance under very cold conditions and at high temperature.

Figure 7:
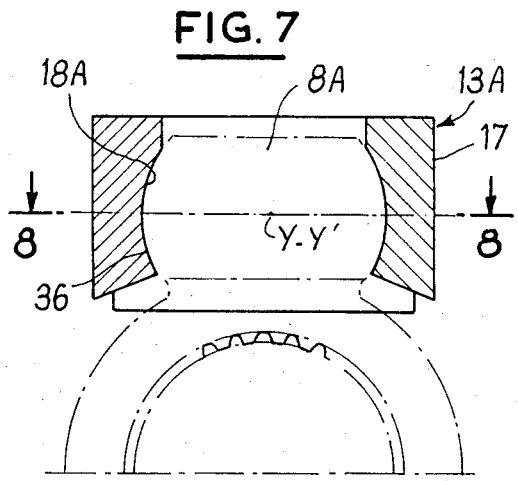
FIG. 7 is a partial cross-sectional view of a modification of the joint according to the invention.
Figure 8:
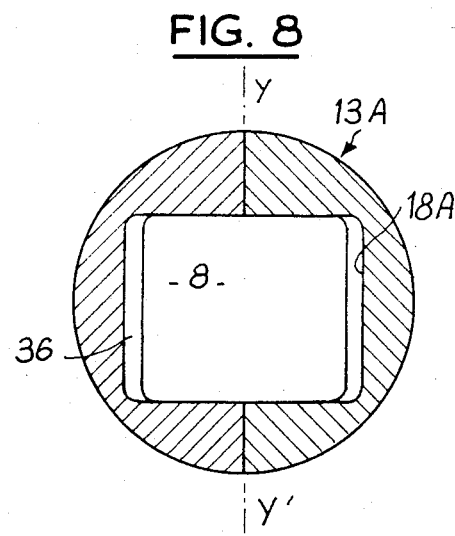
FIG. 8 is a sectional view taken along line 8—8 of FIG. 7.

As can be seen in FIGS. 7 and 8, the slidable and pivotable mounting of the rollers 12 can be achieved by other means. For example, as illustrated, each bearing bush 13A can have a continuous cylindrical outer surface 17, i.e. without a diametrical bore 19, with an axial aperture 18A in the shape of a cylinder having an axis Y—Y directly cooperating with a corresponding cylindrical surface 36 of the arm 8A of the tripod element. In order to allow the mounting, as shown in FIG. 8, the bearing bush may be formed by two halves which are maintained in adjoining relation by the associated roller.

In another modification, other sectional shapes of the outer surface of the rollers may be envisaged, for example a cylindrical shape chamfered at each end. The associated surface of the track then has a substantially corresponding section and there may be employed, in order to facilitate the production of these surfaces, parts which are mounted in the bell element. Such modifications are shown in the French patent application No. 81.10 797. Here again, the tracks will surround the rollers to large angular extents, of the order of 120°.

In each embodiment, although it has not been illustrated, a gaiter for protecting the mechanism and retaining the lubricant is provided. Further, the axis of the line 28 through the center of each track may, instead of passing through the centre 0 of the joint as in FIGS. 1 and 2, be slightly offset relative to the corresponding diameter of the bell element either axially or radially or axially and radially.

The invention is applicable also to fixed tripod joints in which the arms of the tripod elements are convergent and not divergent and extend radially through the bell element provided with the tracks. However, the important advantage of small radial overall size of the joint is then lost. Further, the outer surface of the rollers may also be concave, in which case the tracks would then have a convex contour.

Having now described my invention what I claim as new and desire to secure by letters patent is:

1. A constant-speed tripod joint comprising:
   a bell element provided internally with three pairs of tracks, each said track having a configuration such that a center line thereof is curved;
   a tripod element axially fixed within said bell element and having an axis of rotation, said tripod element having three arms extending radially outward therefrom, each said arm having a pivot axis parallel to said axis of rotation;
   each said arm having rotatably and slidably mounted thereon a roller engaging a respective said pair of tracks;
   each arm having means for mounting each said roller for pivotal movement about only a respective single axis which extends substantially parallel to said axis of rotation of said tripod element and which comprises said pivot axis of the respective said arm; and
   said tripod element being axially retained in said bell element by said rollers bearing along edge portions of the respective said tracks and by contact of each said roller with a respective point of an inner spherical surface of said bell element.

2. A joint as claimed in claim 1, wherein each said roller is rotatably mounted on the respective said arm by a bearing bush and a pivot pin extending through a diametrical bore in said bush and through a bore in said respective arm, each said pivot pin having a longitudinal axis colinear with the respective said single axis.

3. A joint as claimed in claim 2, wherein said bearing bush has an axial aperture having a constant rectangular section, the respective said arm has a cylindrical shape which is defined by a cylindrical surface about the respective said pivot axis extending parallel to said axis of rotation of said tripod element and which is adapted to said aperture, and said respective arm extends through said aperture.

4. A joint as claimed in claim 2, wherein said bearing bush has recesses on two surfaces thereof.

5. A joint as claimed in claim 2, wherein each said roller is rotatably mounted on said bearing bush by means of needle bearings, and said pivot pin has spherical opposite ends which are centered on said longitudinal axis of said pin.

6. A joint as claimed in claim 1, wherein each said roller is rotatably mounted on a bearing bush which has a diametrical cylindrical aperture which cooperates with a corresponding cylindrical surface on the respective said arm of said tripod element, said cylindrical surface being formed about the respective said pivot axis extending parallel to said axis of rotation of said tripod element.

7. A joint as claimed in claim 1, wherein each said rollers has toric rolling surface, and each said track has a matching toric surface which is bordered on the outer edge of said track by a spherical region centered on the center of said ball element.

8. A joint as claimed in claim 7, wherein said toric surface of each said roller is extended by two frusto-conical surfaces.

9. A joint as claimed in claim 1, wherein each said track surrounds the corresponding said roller to an angular extent of substantially 120°.

* * * * *